(12) United States Patent
Tinari et al.

(10) Patent No.: US 10,789,423 B2
(45) Date of Patent: Sep. 29, 2020

(54) CONTROLLING A COLLABORATIVE DATA PREPARATION PROCESS

(71) Applicant: SAP SE, Walldorf (DE)

(72) Inventors: Phil Tinari, Pacifica, CA (US); Marius Obert, Oberwolfach (DE); Claudia Lehmann, Mountain View, CA (US); Johan Raffin, Mountain View, CA (US); Dennis Seah, Cupertino, CA (US)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 15/383,802

(22) Filed: Dec. 19, 2016

(65) Prior Publication Data

US 2018/0173378 A1 Jun. 21, 2018

(51) Int. Cl.
*G06F 3/0482* (2013.01)
*G06F 17/22* (2006.01)
*G06F 17/24* (2006.01)
*G06F 40/197* (2020.01)
*G06Q 10/10* (2012.01)
*G06F 40/166* (2020.01)

(52) U.S. Cl.
CPC .......... *G06F 40/197* (2020.01); *G06F 40/166* (2020.01); *G06Q 10/101* (2013.01)

(58) Field of Classification Search
CPC .... G06F 17/00; G06F 17/30873; G06F 17/22; G06F 17/24; G06F 3/0482; G06F 40/197; G06F 40/166; G06Q 10/10; G06Q 10/101
See application file for complete search history.

(56) References Cited

U.S. PATENT DOCUMENTS

| 6,910,044 | B2 | 6/2005 | Weinberg et al. |
| 6,938,038 | B2 | 8/2005 | Weinberg et al. |
| 7,143,339 | B2 | 11/2006 | Weinberg et al. |
| 7,356,492 | B2 | 4/2008 | Hazi et al. |
| 7,430,715 | B2 | 9/2008 | Sullivan et al. |
| 7,437,379 | B2 | 10/2008 | Brookler et al. |
| 7,657,511 | B2 | 2/2010 | Brookler et al. |
| 7,664,737 | B2 | 2/2010 | Brookler et al. |
| 7,672,942 | B2 | 3/2010 | Weinberg et al. |
| 7,689,631 | B2 | 3/2010 | Sullivan et al. |
| 7,725,471 | B2 | 5/2010 | Weinberg et al. |

(Continued)

*Primary Examiner* — Stephen S Hong
*Assistant Examiner* — Ahamed I Nazar
(74) *Attorney, Agent, or Firm* — Fish & Richardson P.C.

(57) ABSTRACT

The disclosure generally describes methods, software, and systems, including a method for managing modifications to a document by collaborators. A digital document is identified for collaboration by a first user having ownership privileges for the document. The collaboration is associated with at least one collaborator. A duplicate version of the identified document is provided to each of the identified collaborators. The duplicate versions are monitored for modifications performed by corresponding collaborators. A list of modifications is created that identifies the modifications performed by the corresponding collaborators in the duplicate versions associated with those collaborators. A selection from the list of modifications is received from the first user of at least one modification for incorporation into the identified document. Based on the received selection, the selected at least one modification is merged into the identified document.

20 Claims, 7 Drawing Sheets

(56) References Cited

U.S. PATENT DOCUMENTS

| | | | |
|---|---|---|---|
| 8,370,757 B2 | 2/2013 | Tinari et al. | |
| 2003/0214528 A1* | 11/2003 | Pierce | G06F 17/241 715/723 |
| 2008/0235579 A1* | 9/2008 | Champion | G06F 40/194 715/273 |
| 2008/0313049 A1* | 12/2008 | Lai | G06Q 10/087 705/27.1 |
| 2009/0271696 A1* | 10/2009 | Bailor | G06F 16/954 715/229 |
| 2012/0110445 A1* | 5/2012 | Greenspan | G06F 17/2288 715/256 |
| 2013/0124956 A1* | 5/2013 | Hatfield | G06F 17/2288 715/211 |
| 2013/0160142 A1* | 6/2013 | Lai | G06F 21/6209 726/28 |
| 2013/0326330 A1* | 12/2013 | Harris | G06F 17/2288 715/234 |
| 2014/0173423 A1* | 6/2014 | Meisels | G06F 40/166 715/255 |
| 2014/0258832 A1* | 9/2014 | Hepp | G06F 40/166 715/234 |
| 2014/0281867 A1* | 9/2014 | Vogel | G06F 40/18 715/212 |
| 2014/0337279 A1* | 11/2014 | Mo | G06Q 10/101 707/608 |
| 2015/0074145 A1* | 3/2015 | Homer | G06F 16/93 707/772 |
| 2015/0378972 A1* | 12/2015 | Kapadia | G06F 40/197 715/229 |
| 2016/0321231 A1* | 11/2016 | Lehmann | G06T 11/206 |
| 2016/0321233 A1* | 11/2016 | He | G06T 11/206 |

* cited by examiner

400

Merge Action Items

414 | 412

Customers 404 | Customers (1) 402

Create Worksheet 408 | Create Worksheet 410
Author: TESTER (Tue, January 12, 2020, 1:38 PM PST) | Author: TESTER (Tue, January 12, 2020, 1:38 PM PST)

To Number on ID 416 | To Number on ID 418
Author: TESTER (Thu, January 14, 2020, 3:46 PM PST) | Author: TESTER (Thu, January 14, 2020, 3:46 PM PST)

Remove Column 420
Author: TESTER2 (Thu, January 14, 2020, 4:54 PM PST)
Remove on TITLE 425 — Split on NAME_LINE 422
Author: TESTER2 (Thu, January 14, 2020, 4:54 PM PST)
Split string " ", New columns NAME_LINE1, NAME_LINE2

Rename on FIRST_NAME 424
Author: TESTER2 (Thu, January 14, 2020, 4:55 PM PST)
New Name: FIRST_NAME

406

426 — ✓ Approve All Changes

Create Worksheet     *308*
Author: TESTER (Tue, January 12, 2020, 1:36 PM PST)

To Number on ID     *310*
Author: TESTER (Thu, January 14, 2020, 3:45 PM PST)

Split on NAME_LINE     *316*
Split string " ". New columns NAME_LINE1, NAME_LINE2
Author: TESTER (Thu, January 14, 2020, 5:08 PM PST)

Rename on NAME_LINE1     *318*
New Name: FIRST_NAME
Author: TESTER (Thu, January 14, 2020, 5:08 PM PST)

Rename on NAME_LINE2     *324*
New Name: LAST_NAME
Author: TESTER (Thu, January 14, 2020, 5:08 PM PST)

Remove Column     *326*
Remove on ADDRESS3
Author: TESTER (Thu, January 14, 2020, 5:09 PM PST)

Replace on COUNTRY     *328*
From "US" to "United States"
Author: TESTER (Thu, January 14, 2020, 5:09 PM PST)

Combine Columns into POSTCODE     *330*
into POSTCODE_REGION
Author: TESTER (Thu, January 14, 2020, 5:09 PM PST)

FIG. 5

CONTROLLING A COLLABORATIVE DATA PREPARATION PROCESS

BACKGROUND

The present disclosure relates to coordinating collaboration on a document, such as to enable and coordinate changes to the document by collaborators. For example, an owner of a document, such as a text document, can prepare and share the document with collaborators who, in addition to the owner, may make specific changes to the document. In some cases, collaboration on the document can be facilitated using one or more of tracked changes, comments in the margins, and/or other document collaboration tools.

SUMMARY

This disclosure generally describes computer-implemented methods, software, and systems for handling collaboration including modifications to a document. One computer-implemented method includes: identifying a digital document for collaboration, the document identified by a first user with ownership privileges for the document, the collaboration associated with at least one collaborator; providing a duplicate version of the identified document to each of the at least one identified collaborators; monitoring the duplicate versions for modifications performed by corresponding collaborators; creating a list of modifications, the created list identifying the modifications performed by the corresponding collaborators in the duplicate versions associated with those collaborators; receiving, from the first user, a selection from the list of modifications of at least one modification for incorporation into the identified document; and merging, based on the received selection, the selected at least one modification into the identified document.

The foregoing and other implementations can each optionally include one or more of the following features, alone or in combination. In particular, one implementation can include all the following features:

In a first aspect, combinable with any of the previous aspects, the list of modifications includes actionable controls for performing actions on modifications in the list, the actions including: a modification acceptance action, wherein receiving the selection from a list of modifications includes selecting the modification acceptance action; and a modification rejection action, wherein receiving selection of the modification rejection action for a particular modification causes the particular modification to be discarded.

In a second aspect, combinable with any of the previous aspects, creating the list of modifications includes identifying modifications made by particular collaborators to particular duplicate versions of the identified document, each identified modification identifying the particular collaborator and including a description of the modification.

In a third aspect, combinable with any of the previous aspects, the method further comprises providing the duplicate version of the identified document to each of one or more additional collaborators; and monitoring the duplicate versions for modifications performed by corresponding additional collaborators.

In a fourth aspect, combinable with any of the previous aspects, merging the selected at least one modification into the identified document includes: moving the selected at least one modification into a new position in the list of modifications; and annotating the list of modifications to indicate that the selected at least one modification has been merged.

In a fifth aspect, combinable with any of the previous aspects, the list of modifications includes at least one modification made by the owner to the identified document, and wherein the method further comprises: adding, to the list of modifications, the at least one modification made by the owner; and annotating, in the list of modifications, the at least one modification made by the owner.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 is a screenshot of an example user interface for merging modifications to a document.

FIG. 5 is a screenshot of an example action history corresponding to the example collaboration workflow of FIG. 3.

DETAILED DESCRIPTION

Figure 1:
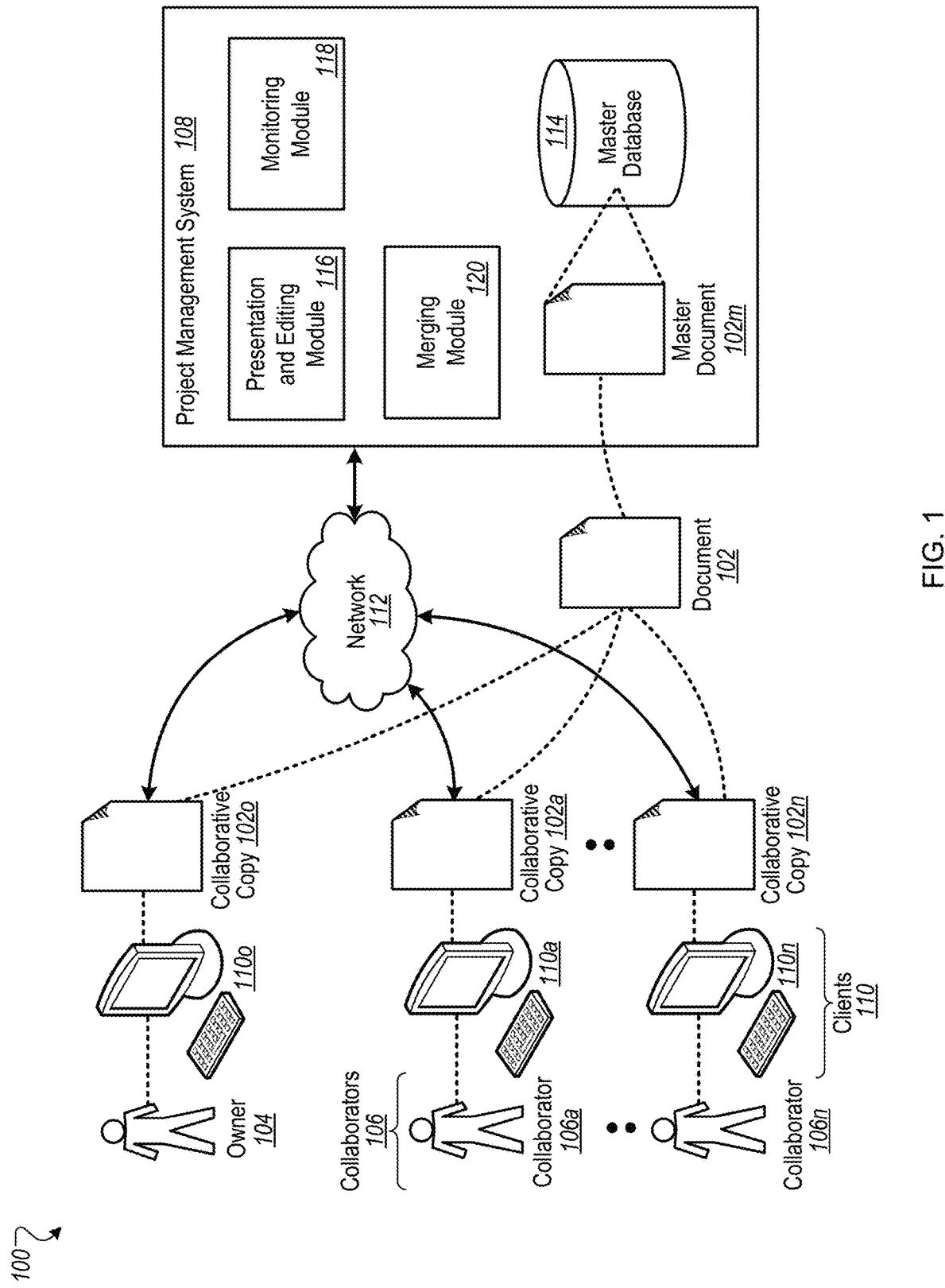
FIG. 1 is a block diagram of an example environment for controlling a collaboration process on a document.

This disclosure generally describes computer-implemented methods, software, and systems for managing modifications to a document by collaborators, including a method for managing modifications to a document by collaborators. A digital document is identified for collaboration by a first user having ownership privileges for the document. The collaboration is associated with at least one collaborator. A duplicate version of the identified document is provided to each of the identified collaborators. The duplicate versions are monitored for modifications performed by corresponding collaborators. A list of modifications is created that identifies the modifications performed by the corresponding collaborators in the duplicate versions associated with those collaborators. A selection from the list of modifications is received from the first user of at least one modification for incorporation into the identified document. Based on the received selection, the selected at least one modification is merged into the identified document.

The subject matter described in this specification can be implemented in particular implementations so as to realize one or more of the following advantages. Analysts can prepare their data with collaborators while controlling the data preparation process and protecting sensitive information. Owners of documents can have the flexibility to apply document modifications, create sandboxes to share documents with collaborators, monitor modifications by collaborators, select and merge modifications by collaborators, and delete sandboxes. The owner still has full access to the sandbox, which means the owner can see a preview of the results of the modifications at any given point in time.

An owner of a document, for example, can provide or make available duplicate copies of the document to a group of one or more collaborators. Modifications by the collaborators to the duplicate copies can be monitored automatically using systems and techniques described in this disclosure. The owner can be provided with a list of the modifications from which specific modifications can be selected by the owner for acceptance for merging into the document. Other modifications can be discarded or ignored by the owner.

In addition to text documents, other types of documents can include spreadsheets, comma-separated value (CSV) files, database tables, views in a database, application code, drawings, or other datasets. Corresponding elements in these documents for which collaboration may occur can include, for example: words, frames and formatting; columns, rows and sheets; rows, columns, tables, and views; methods and lines of code; drawing elements such as lines, boxes, text, and widgets; or various dataset elements.

Before initiating collaboration on a document, the owner may create a project, for example, and import the document into a worksheet or into some other structure or container that is suitable for or supports collaboration. The project can include, for example, a collection of worksheets (corresponding to the duplicate copies of the document) that are created by the owner and shared with the collaborators. The collaborators can then manipulate their versions of the worksheets, including modifying data values in one or more fields and/or performing operations on the entire worksheet. As an example, manipulations that are made to change the design of a spreadsheet can range from simple data preparation actions, such as the conversion of string values to lower case, to complex actions, such as the removal of duplicate records, adding, modifying, or deleting rows or columns in the spreadsheet, or modifying the value of a particular cell. Modifications made by a particular collaborator can be private between the owner and the particular collaborator in some instances.

In some implementations, initial modifications to a worksheet can be performed by the owner, such as before the worksheet is shared. The modifications can be shown in the action history. The owner can review the modifications, for example, before or after sharing the worksheet is shared with collaborators.

Upon creating a project and importing the dataset into a worksheet, for example, the analyst can be designated as the owner of the project and the worksheets. The owner of a worksheet can share it with other analysts who are the project collaborators. Collaborators can each separately access and modify a worksheet. However, collaborators cannot delete the worksheet or add other worksheets to the project. In some instances, the owner may identify a first set of collaborators initially, and can add additional collaborators (e.g., individuals or a group of collaborators) throughout the project's existence.

Using systems and techniques described herein, in order to share an original worksheet with collaborators, the owner can create a duplicate of the document for each collaborator. Essentially, each duplicate can serve as a sandbox in which the collaborator can work. The duplicates can be tracked in order to detect modifications, and a list of modifications identifying specific changes and associated collaborators can be presented to the owner, who can decide on a case-by-case basis which modifications are to be merged into the document. The monitored changes and modifications performed by the collaborators can, in some cases, be monitored in real-time or near real-time, where a running list of modifications may be visible to the owner.

FIG. 1 is a block diagram of an example environment 100 for controlling a collaboration process on a document 102. Conceptually, the document 102 can be or include various instances and versions of a master document 102*m*, for example. The collaboration process can include, for example, distribution of the document 102, such as by creating and providing collaborative copies of the master document 102*m* to collaborators. In a controlled sequence of proposed changes made by collaborators during the collaboration process, approval can occur on none, some, or all proposed modifications. For example, approved changes can be merged into the master document 102*m*.

An owner 104 can own the document and can control collaborative changes to the document by one or more collaborators 106. The collaboration process can be controlled, for example, by a project management system 108 that can distribute collaboration copies 102*a*-102*n* of the document to collaborators 106*a*-106*n*, respectively. In some implementations, the project management system 108 can reside in memory at the client 110 of the owner 104, or the project management system 108 can reside at a location accessible to the owner 104 and collaborators 106. The owner 104 can also have access to a collaboration copy 102*o*, which can be a collaborative copy of the master document 102*m* or can be the master document 102*m* itself.

The environment 100 includes one or more clients 110, including a client 110*o* of the owner 104 and clients 110*a*-110*n* of the collaborators 106*a*-106*n*, respectively. Versions of the document can be presented, for example, in a user interface of one or more of clients 110. For example, the owner 104 can prepare the document 102, decide who the collaborators 106 are to be, then initiate distribution of the collaboration copies 102*a*-102*n* to the collaborators 106*a*-106*n* to initiate collaboration. Throughout the collaboration process, the project management system 108 can operate as a backend system (and essentially a data base) from which the owner 104 can access the master document 102*m* and the collaborators 106*a*-106*n* can access their respective collaboration copies 102*a*-102*n*. The collaborative process can make use of a network 112 that connects the clients 110 to the project management system 108, over which the collaboration copies 102*a*-102*n* are distributed or made accessible.

The owner 104 can use the client 110*o*, for example, to perform master user and administration operations on the document. For example, at the client 110, the owner can view and manage modifications to the document, such as modifications suggested by the collaborators 106, and decide which modifications are to be incorporated in an updated version of the master document 102*m*.

The project management system 108 can include a master database 114 that includes the master document 102*m* that is initially created by the owner 104 who can also maintain an up-to-date merged version of the master document 102*m* over time. A current version of the master document 102*m* that is stored, for example, can be used by the project management system 108 to generate the collaboration copies 102*a*-102*n*. In some implementations, the master database 114 can be an in-memory database, such as at the project management system 108. At any time, the master database 114 can be used to generate or update a collaboration copy 102*a*-102*n*.

The project management system 108 can include various modules 116-120 and/or tools for use in the collaboration process. In some implementations, some or all of the modules and/or tools can reside at the project management system 108, remote from the clients 110, the owner 104, and the collaborators 106a-106n. Additionally, some of the functionality of the modules and/or tools of the project management system 108 can reside in applications located at, or accessible from, the clients 110 and used in the collaboration process.

A presentation and editing module 116, for example, can generate the collaboration copies 102a-102n from the master document 102m, such as stored in the master database 114 at any given time. The presentation and editing module 116 can further support the display and editing of the document and the collaboration copies 102a-102n at the respective clients 110. In some implementations, owners and/or collaborators can be presented with graphs or other displays that provide a visualization of the content of their document in a graphical manner. In some implementations, rules can be used to receive and/or use key performance indicators (KPIs) or other rule results to assess the quality of the data.

A monitoring module 118, for example, can monitor modifications made to the document 102, such as at the clients 110. As an example, the monitoring module 118 can detect when a modification has been made on the collaboration copy 102a by the collaborator 106a, or on collaborative copies of other collaborators. Monitoring can also include tracking which collaborator 106, for example, made a corresponding modification. This information can be used, for example, to support a presentation to the owner 104 of what modifications have occurred and who the collaborator is who made each modification. In some implementations, the monitoring module 118 can identify which of the collaboration copies 102a-102n are made available to respective computers/systems of the collaborators 106a-106n. The monitoring module 118 can also collect and automatically add modifications, for example, to a created list of modifications for presentation to the owner 104.

A merging module 120, for example, can incorporate, into the master version of the document 102, one or more of the monitored modifications from the collaboration copies 102a-102n. The particular modifications that are merged can depend on selections made by the owner 104, such as after the owner 104 is presented with information identifying the modifications and the collaborators who made them.

Clients 110o, 110a-110n may access the modules 116, 118, 120 via a centralized portal or a cloud-based connection or application, as well as any other suitable mechanism allowing access to the original and collaboration copies 102a-102n. In some instances, some or all of the modules may be available at the clients 110o, 110a-110n, where a synchronizing mechanism is used to provide modifications to a centralized or specific location, including client 110o of the owner 104. The systems there can manage the presentation, selection, and incorporation of particular modifications into the owner's version of the document 102.

In some implementations, the merging module 120 can handle conflicts. For example, the owner of a document may have deleted a column in the worksheet after creating the sandbox for collaborators. If now a collaborator performs actions on that column and the owner tries to merge them (because the owner forgot that he deleted the column), a conflict is created.

In some implementations, the merging module 120 can be able to identify dependencies between actions. For example, a collaborator may propose to convert a numeric column to text and then split the column into two separate columns. If the owner wants to merge the split action, the owner must also have to merge the conversion action because split actions are only allowed on text columns. In this case, the merging module can highlight and enforce this dependency during the merge process.

In some implementations, a notification/communication module can exist that is responsible for the communication between the owner and collaborators. Communications can include, for example, notifying a collaborator that a sandbox has been created and shared by the owner, inform a collaborator about his/her data preparation task to be completed in the sandbox, notifying the owner that a collaborator has completed his/her data preparation task, notifying a collaborator that his/her proposed data preparation actions have been merged into the original worksheet, and notifying a collaborator that his/her sandbox has been deleted or re-initialized by the owner.

Figure 2:
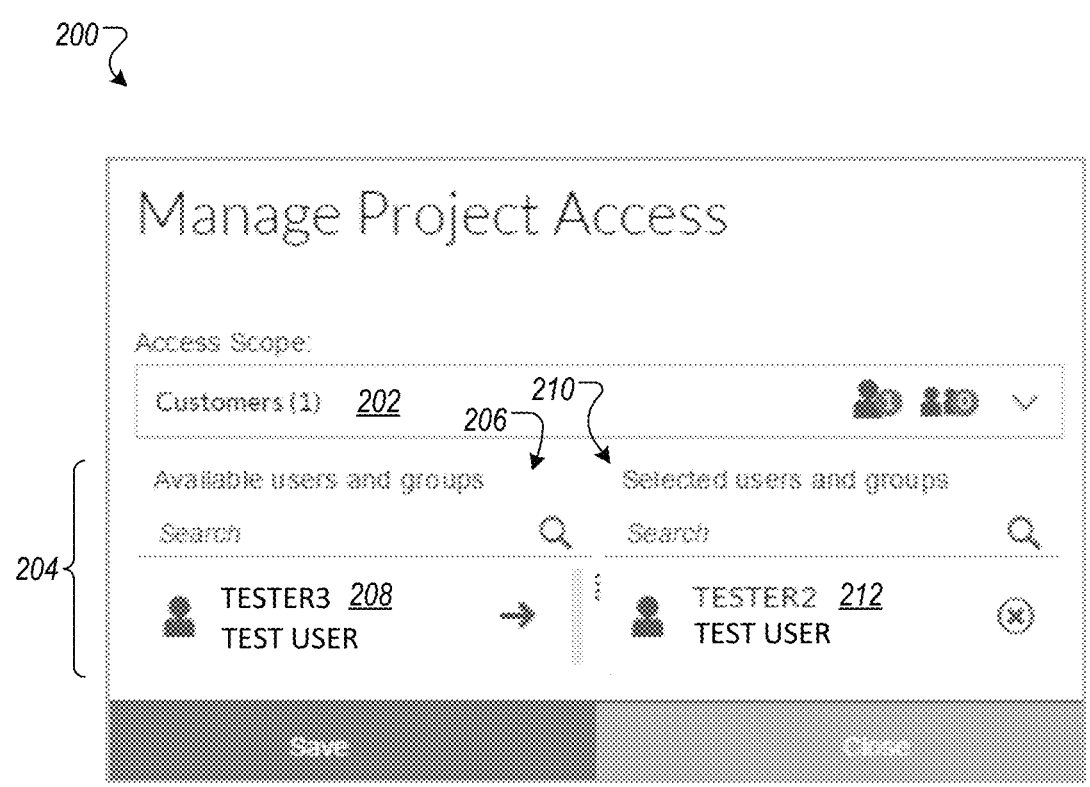
FIG. 2 is a screenshot of an example user interface for sharing a document with collaborators.

FIG. 2 is a screenshot of an example user interface 200 for sharing a document with collaborators. The document can be a worksheet 202, for example, having a worksheet name of "Customers (1)". The user interface 200 is a tool that is used by the owner 104, for example, to decide which of the collaborators 106a-106n are to receive their respective collaboration copies 102a-102n. For example, the user interface 200 can include controls 204 by which the owner of the "Customers (1)" worksheet can select specific collaborators with which to share the worksheet 202. In some implementations, the user interface 200 can be provided or supported by the presentation and editing module 116.

In an available collaborators area 206, for example, a collaborator 208, such as "TESTER3" can be selected for inclusion in the group of collaborators of "Customers(1)." A selected collaborators area 210 can identify collaborators that have been selected, such as a collaborator 212 named "TESTER2," for inclusion in the group of collaborators of "Customers(1)." In some implementations, names of collaborators can group names that refer to groups of collaborators. In some implementations, the user interface 200 can include additional controls by which portions of the document and or selected data preparation actions can be designated as being the responsibility of specific collaborators. By sharing the "Customers (1)" worksheet, including with designated responsibilities and/or restrictions, the original worksheet can be protected from modification by anyone other than the owner and limited to data preparation actions designated for each of the collaborators. Further, collaboration can occur by the collaborators in private, e.g., visible only to the owner but no other collaborators. In some instances, a first set of collaborators may be identified initially, with one or more additional collaborators being added while the project is active and previous modifications by the first set of collaborators have been received. For example, sometime after initial collaborators 212 have received the worksheet, and optionally after collaboration has begun, the owner 104 can provide the worksheet (or an updated version thereof) to additional collaborators, and the owner 104 can invite the additional collaborators to collaborate on the worksheet.

It can be up to the owner of the original worksheet to perform initial data preparation actions before designating collaborators and sharing the worksheet. Then, collaboration copies of the worksheet can reflect any initial data preparation actions of the owner. In some instances, these initial data preparation actions may be identified to the collaborators, but may not be changed or revised by them.

A collaborator can make modifications in the collaboration copy, e.g., including based on instructions of what is to be done by the collaborator. For example, the owner may have asked the collaborator to prepare the columns related to a person's name in a customer dataset. According to the assignment, the collaborator can propose modifications to the document, such as splitting the name into a first name and a last name.

During actions of the collaborator, the modifications are not visible to anyone else other than the collaborator and the owner. The modifications are only effective in the collaboration copy and not applied to the original worksheet, at least not until the owner decides to apply the modifications. In some implementations, modifications can be visible to collaborators for various reasons, such as if the same sandbox is shared with a group of collaborators (in this case everyone could see the change).

At any point, the owner can merge modifications from the collaboration copies of the collaborators into the original worksheet. For example, the owner can select none, all, or a subset of the modifications as modifications to be merged into the master document. In this manner, not selecting a modification basically means rejecting the modification, because the modification will not be applied to the original worksheet. In some instances, an explicit rejections option may be available. At this time, the owner can decide to re-initialize the collaboration copies so that the collaborators can work on newly approved versions of the collaboration copies.

Figure 3:
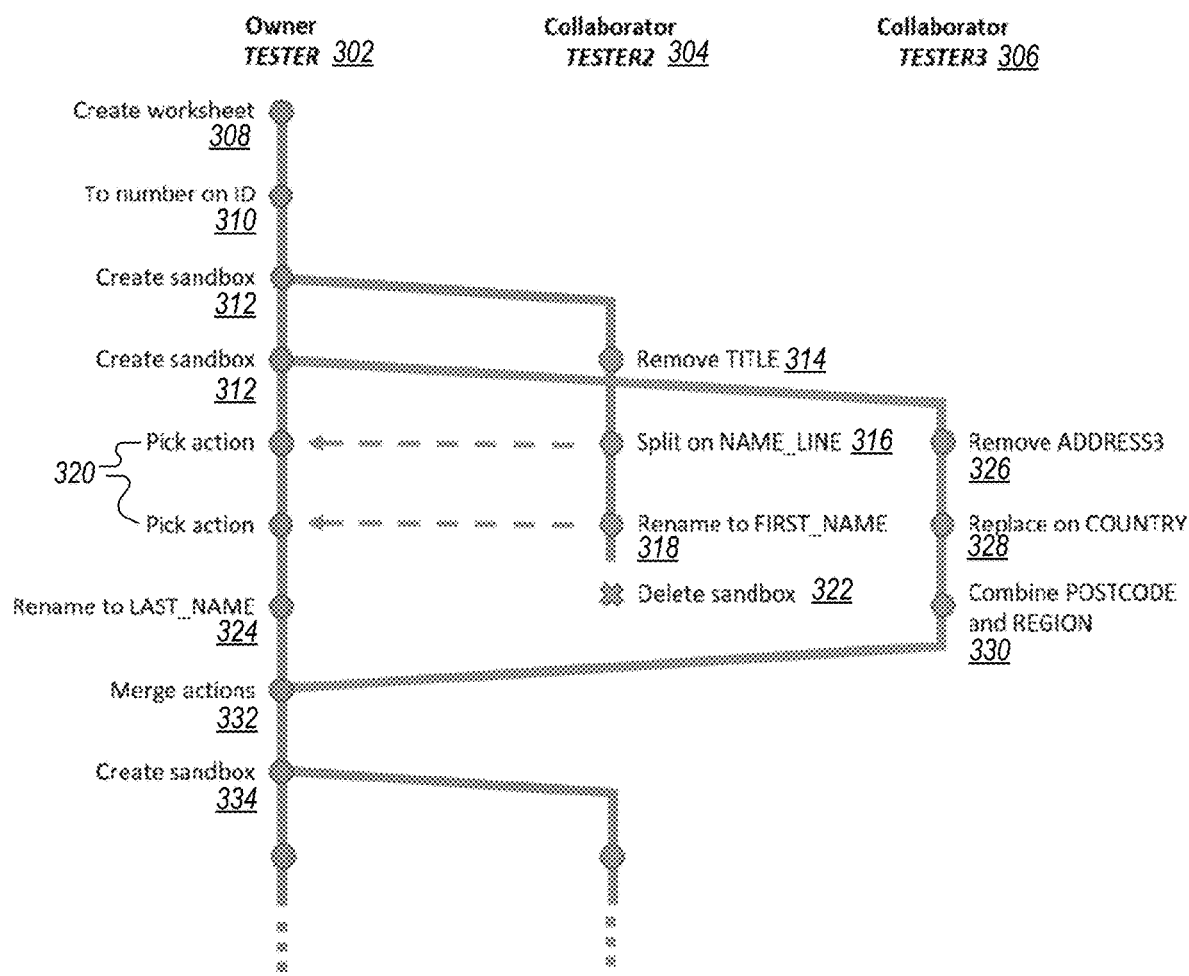
FIG. 3 shows an example collaboration workflow for collaborative modifications to a document.

FIG. 3 shows an example collaboration workflow 300 for collaborative modifications to a document. The collaboration workflow 300 shows example events that can occur in association with an owner 302 (e.g., TESTER), a first collaborator 304 (e.g., TESTER2), and a second collaborator 306 (e.g., TESTER3) who each may be business analysts or other people who are collaborating on the document. For example, the document can be a worksheet that is being prepared as a customer dataset. The owner and collaborators in FIG. 3 can correspond, for example, to the owner and collaborators in FIG. 1.

As an initial event in the collaboration workflow 300, the owner 302 can import (308) data into a worksheet, an action that can result in designating the owner 302 as the owner of the worksheet. As a next action, the owner 302 can convert (310) an ID column in the worksheet from a text column to a numeric column. Then, the owner 302 can create (312) sandboxes (i.e., collaboration copies corresponding to the owner's version of the worksheet) for the first collaborator 304 and the second collaborator 306 so that collaboration on the worksheet can begin. The first collaborator 304, for example, may be responsible for columns in the worksheet that are related to a person's name, whereas the second collaborator 306 may have the responsibility, for example, to design address-related columns.

The first collaborator 304 can start performing actions on the worksheet, for example, by removing (314) the TITLE column, such as if it is known that more than 90% of the values are empty. Then, the first collaborator 304 can split (316) the column NAME_LINE into two columns, such as NAME_LINE1 and NAME_LINE2. As a result of the split, for example, the first column can hold the first name, and the second column can hold the last name. The first collaborator 304 can then rename (318) the newly-generated column NAME_LINE1 to FIRST_NAME.

Upon determining that the modifications have occurred, such as through information presented in a user interface at the client 110o, the owner 302 can begin making decisions regarding modifications made to the worksheet by collaborators. For example, the owner 302 may decide to pick, or select, (320) the last two modifications resulting from actions of the first collaborator 304 in the sandbox and merge the modifications into the original worksheet. Yet, by not selecting the modification of the removal of the TITLE column, the owner 302 can implicitly reject that modification and instead retain the TITLE column. Further, the owner 302 can delete or close (322) the sandbox of the first collaborator 304 to end, at least for the moment, collaboration by first collaborator 304. Finally, the owner 302 can rename (324) the newly-generated column NAME_LINE2 to LAST_NAME.

During this time, the second collaborator 306 can address the address-related columns in the worksheet. First, the second collaborator 306 can remove (326) the column ADDRESS3 (e.g., where it is known that the column is completely empty for all entries). Second, the second collaborator 306 can replace (328) the value "US" in the COUNTRY column with a "United States" value. Third, the second collaborator 306 can create (330) a new column containing the combined values of the POSTCODE column and the REGION column.

The owner 302 can agree with and approve all these modifications of the second collaborator 306 and can merge (332) the modifications into the original worksheet, thus also creating an up-to-date working version of the worksheet. The owner 302 can then create (334) a new sandbox for the first collaborator 304 to complete further tasks. As such, with these actions by the owner 302 during the complete data preparation process, the owner 302 is in charge of delegating the tasks and approving or rejecting modifications proposed by the collaborators. At the same time, the owner 302 can prepare the owner's own data.

FIG. 4 is a screenshot of an example user interface 400 for merging modifications to a document. For example, using the user interface 400, the owner 302 can merge modifications made to the worksheet (e.g., a worksheet 402 named "Customers (1)") by the first collaborator 304 and the second collaborator 306 into the master document (e.g., a master document 404 named "Customers"). Dialog entries 406 displayed in the user interface 400 can indicate actions taken by the owner 302 and the first collaborator 304. The master document 404 can correspond, for example, to the master document 102m.

Entries in the user interface 400 correspond to events in the collaboration workflow 300. For example, dialog entries 408 and 410 correspond to the event 308, dialog entries 416 and 418 correspond to the event 310, dialog entry 420 corresponds to the event 314, dialog entry 422 corresponds to the event 316, and dialog entry 424 corresponds to the event 318.

In some implementations, disposition of the actions can be indicated, such as through visible differentiations that are made to fonts used for the dialog entries 406. For example, dialog entries 406 can be grayed out for actions by the owner or collaborators for which the modifications have been applied. A dialog entry 408 that is not grayed out, for example, indicates that the owner 302 has created the worksheet. The corresponding dialog entry 410 is grayed out, indicating that the actions are the owner's, and all worksheets already have the changes in common. A right side 412 primarily lists collaborator actions (e.g., modifications to the worksheet). In such instances, the changes by collaborators 304 have been made, and collaborators 304 can receive notification that such modifications have been accepted. The remaining dialog entries 406 can illustrate, for example, actions by the owner 302 to select actions from the sandbox of the first collaborator 304 (and corresponding modifications) to be merged into the worksheet. In some implementations, controls 425 can be used to hide or expose past actions between two worksheets. This way, the owner can either see the entire history or only differences.

A left side 414 can include an action history that applies to the "Customers" master document 404. For example, the dialog entry 410 indicates creation of the worksheet from the master document. The dialog entry 416 indicates acceptance by the owner 302 of an action described by a dialog entry 418. For example, the dialog entry 418 indicates an action by the owner 302 to make a modification to change the ID column from text to numeric. Remaining dialog entries 406 in the right side 412 show an action history of the sandbox of the first collaborator 304, specifically the "Customers (1)" worksheet 402. For example, a dialog entry 420 indicates that the first collaborator 304 has removed the column TITLE. An entry 422 indicates that the first collaborator 304 has split the column NAME_LINE into NAME_LINE1 and NAME_LINE2. An entry 424 indicates that the first collaborator 304 has renamed the column NAME_LINE1 to FIRST_NAME. Dialog entries 420, 422, 424 are shown in normal text (e.g., not grayed out) because the modifications are pending and not yet accepted by the owner 302.

The owner 302 can use various controls on the user interface 400 when deciding which actions to pick and which modifications to accept. Individual ones of the dialog entries 406 can be selected, such as by clicking on the corresponding entry. A control 426 can be used to approve all pending modifications. In some implementations, the owner 302 can drag and drop modifications, such as to change the order of the modifications.

FIG. 5 is a screenshot of an example action history 500 corresponding to the example collaboration workflow 300 of FIG. 3. The action history 500 contains all actions executed by the owner of the data preparation process, as well as the approved actions from the first collaborator 304 and the second collaborator 306. However, the rejected actions are not applied to the original worksheet and therefore are not included in the illustration. Entries in the action history 500 are numbered to indicate equivalent entries in the collaboration workflow 300.

Figure 6:
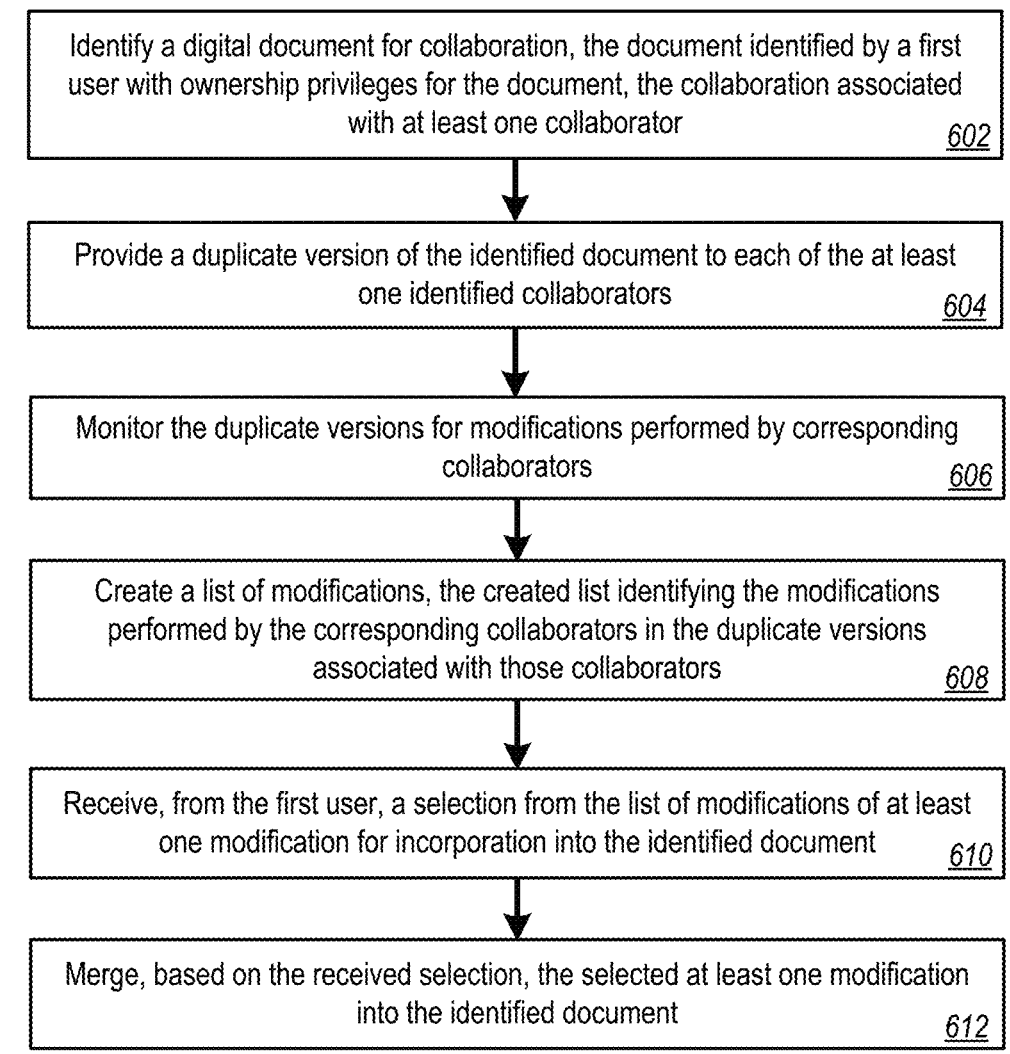
FIG. 6 is a flowchart of an example method for controlling a collaboration process on a document.

FIG. 6 is a flowchart of an example method 600 for controlling a collaboration process on a document. For clarity of presentation, the description that follows generally describes method 600 in the context of FIGS. 1, 3, and 4.

At 602, a digital document is identified for collaboration. The digital document is identified by a first user who has ownership privileges for the digital document. The collaboration is associated with at least one collaborator. The owner 104, for example, can identify the document 102 as the document on which collaboration is to occur with collaborators 106.

At 604, a duplicate version of the identified document is provided to each of the at least one identified collaborators. The master document 102m is a master version of the document 102 from which collaboration copies 102a-102n can be distributed by the project management system 108 to the collaborators 106.

At 606, the duplicate versions are monitored for modifications performed by corresponding collaborators. As an example, the monitoring module 118 can monitor the collaboration copies 102a-102n for changes that occur over time.

At 608, a list of modifications is created. The created list identifies the modifications performed by the corresponding collaborators in the duplicate versions associated with those collaborators. For example, referring to FIG. 4, the right side 412, presented to the owner 104, can include entries 420, 422, 424 (among others) that identify modifications made by the collaborators. One of the modifications is indicated in the entry 422, in which the Name column is split, by a collaborator TESTER2, into a first name and a last name. Referring to FIG. 3, modifications corresponding to entries 420, 422, 424 are selectable by the owner 302 for merging into the document 102.

In some implementations, the list of modifications can include actionable controls for performing actions on modifications in the list. For example, the user interface 400 can include controls, such as mouse-click selection features or other controls. The controls can include, for example, a modification acceptance action, such as through the user interface 400. For example, upon receiving, from the document owner, a selection of a modification from a list of modifications, the selecting indicates a modification acceptance action. A modification rejection action, for example, can involve receiving a selection of the modification rejection action for a particular modification that causes the particular modification to be discarded.

In some implementations, creating the list of modifications can include identifying modifications made by particular collaborators to particular duplicate versions of the identified document. For example, each identified modification can identify the particular collaborator and can include a description of the modification, such as shown in the user interface 400.

At 610, a selection is received from the list of modifications. The selection is received from the first user and is a selection of at least one modification for incorporation into the identified document. Referring to FIG. 3, the selection 320, for example, is a pick action made by the owner 302, indicating that the owner 302 has picked (or chosen for merging) the split 316 for merging into the document.

At 612, based on the received selection, the selected at least one modification is merged into the identified document. The merging module 120, for example, can merge the modification into the document 102.

In some implementations, the method 600 can further include providing the duplicate version of the identified document to each of one or more additional collaborators, and monitoring the duplicate versions for modifications performed by corresponding additional collaborators. For example, subsequent collaboration copies 102a-102n can be provided to additional collaborators 106. This can occur after collaboration has begun and optionally after merging has occurred.

In some implementations, merging the selected at least one modification into the identified document can include moving the selected at least one modification into a new position in the list of modifications and annotating the list of modifications to indicate that the selected at least one modification has been merged. For example, as modifications are selected on the right side 412 for merging into the document, the modifications can disappear from (or be grayed out on) the right side, and further be listed on the left side 414.

In some implementations, the list of modifications can include at least one modification made by the owner to the identified document. For example, merged entries, such as dialog entries 408 and 416 (and corresponding dialog entries 410 and 418, respectively) can identify, in the list of modifications, the at least one modification made by the owner 104. Modification made by the owner 104 can be annotated, such as by listing the modifications on the left side 414 and graying out the modifications on the right side 412.

Figure 7:
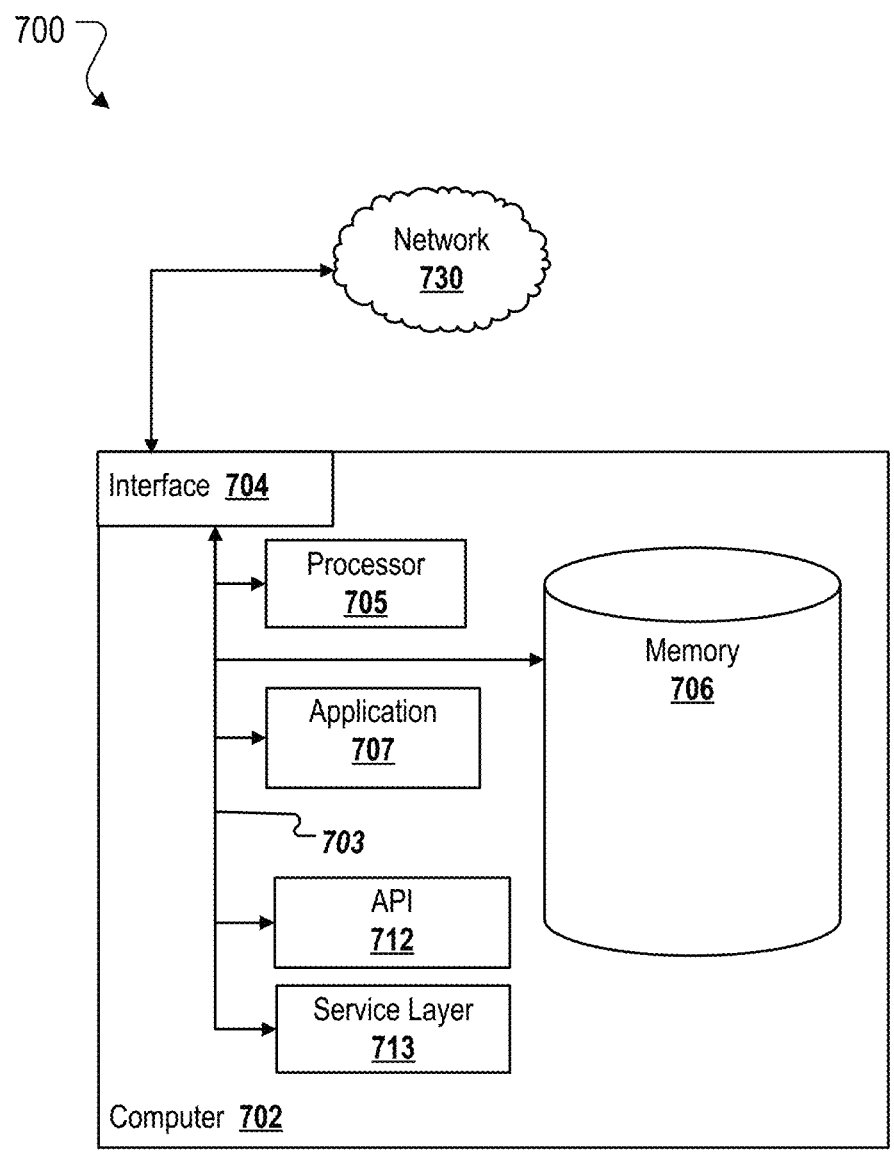
FIG. 7 is a block diagram of an exemplary computer system used to provide computational functionalities associated with described algorithms, methods, functions, processes, flows, and procedures as described in the instant disclosure.

FIG. 7 is a block diagram of an exemplary computer system 700 used to provide computational functionalities associated with described algorithms, methods, functions, processes, flows, and procedures as described in the instant disclosure.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of the instant disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
    identifying a digital document for collaboration, the document identified by a first user with ownership privileges for the document, the collaboration associated with at least one collaborator;
    providing a duplicate version of the identified document to each of the at least one identified collaborators;
    monitoring, by a monitoring module of a project management system tracking the duplicate versions over a network, the duplicate versions for modifications performed by corresponding collaborators, wherein monitoring includes detecting that at least one modification has been made by a particular collaborator to at least one duplicate version, and wherein the monitoring further includes:
        identifying a first modification and a second modification made by a same first collaborator; and
        determining a first dependency that indicates that the second modification is dependent on the first modification in that the second modification requires prior completion of the first modification;
    creating a list of modifications, the created list identifying the modifications performed by the corresponding collaborators in the duplicate versions associated with those collaborators, wherein creating the list of modifications includes updating the list of modifications in response to the monitoring;
    providing, for presentation to the first user, the list of modifications, to enable selection of one or more modifications by the first user for incorporation into the identified document, wherein the providing the list of modifications includes enforcing the first dependency by enabling selection of the second modification by the first user only when the first modification has been selected;
    receiving, from the first user, a selection from the list of modifications of at least one modification for incorporation into the identified document, including:

receiving a first selection, of the first modification;
enabling selection of the second modification in response to receiving the selection of the first modification and based on the second modification being dependent on the first modification; and
receiving a second selection, of the second modification; and
merging, based on the received selection of the at least one modification, the selected at least one modification into the identified document, including identifying the first dependency, and based on identifying the first dependency, determining to merge the second modification after merging the first modification.

2. The computer-implemented method of claim 1, wherein the list of modifications includes actionable controls for performing actions on modifications in the list, the actions including:
a modification acceptance action, wherein receiving the selection from a list of modifications includes selecting the modification acceptance action; and
a modification rejection action, wherein receiving selection of the modification rejection action for a particular modification causes the particular modification to be discarded.

3. The computer-implemented method of claim 1, wherein creating the list of modifications includes identifying modifications made by particular collaborators to particular duplicate versions of the identified document, each identified modification identifying the particular collaborator and including a description of the modification.

4. The computer-implemented method of claim 1, further comprising:
providing the duplicate version of the identified document to each of one or more additional collaborators; and
monitoring the duplicate versions for modifications performed by corresponding additional collaborators.

5. The computer-implemented method of claim 1, wherein merging the selected at least one modification into the identified document includes:
moving the selected at least one modification into a new position in the list of modifications; and
annotating the list of modifications to indicate that the selected at least one modification has been merged.

6. The computer-implemented method of claim 1, wherein the list of modifications includes at least one modification made by the owner to the identified document, and wherein the method further comprises:
adding, to the list of modifications, the at least one modification made by the owner; and
annotating, in the list of modifications, the at least one modification made by the owner.

7. A computer-implemented method comprising:
providing, for presentation in a user interface, a list of modifications to a document upon which at least one collaborator and an owner of the document are collaborating, wherein the list of modifications identifies modifications by the owner and modifications by the at least one collaborator, wherein the list of modifications is created by a project management system including a monitoring module tracking duplicate versions of the document over a network and detecting that at least one modification has been made by a particular collaborator to at least one duplicate version, wherein entries in the list of modifications are separately selectable except when a first modification is dependent on a second modification, wherein the second modification is selectable only when the first modification has been selected, wherein the list of modifications separately identifies modifications that have been merged into the document and modifications that have not been merged into the document, and wherein the list of modifications identifies dependencies between dependent modifications including a first dependency that indicates that the second modification requires prior completion of the first modification; and
receiving, through the user interface and from the owner, a selection of a particular one of the modifications that have not been merged into the document; and
updating the user interface to indicate that the particular one of the modifications has been merged.

8. The computer-implemented method of claim 7, wherein the list of modifications is presented as:
a first column that includes modifications that have been merged into the document; and
a second column that includes modifications by the collaborators that are candidate modifications for being merged.

9. A system comprising:
memory storing user preferences, user contexts and optimized queues; and
a server performing operations comprising:
identifying a digital document for collaboration, the document identified by a first user with ownership privileges for the document, the collaboration associated with at least one collaborator;
providing a duplicate version of the identified document to each of the at least one identified collaborators;
monitoring, by a monitoring module of a project management system tracking the duplicate versions over a network, the duplicate versions for modifications performed by corresponding collaborators, wherein monitoring includes detecting that at least one modification has been made by a particular collaborator to at least one duplicate version, and wherein the monitoring further includes:
identifying a first modification and a second modification made by a same first collaborator; and
determining a first dependency that indicates that the second modification is dependent on the first modification in that the second modification requires prior completion of the first modification;
creating a list of modifications, the created list identifying the modifications performed by the corresponding collaborators in the duplicate versions associated with those collaborators, wherein creating the list of modifications includes updating the list of modifications in response to the monitoring, wherein the list of modifications identifies dependencies between dependent modifications, including the second modification that requires prior completion of the first modification;
providing, for presentation to the first user, the list of modifications, to enable selection of one or more modifications by the first user for incorporation into the identified document, wherein the providing the list of modifications includes enforcing the first dependency by enabling selection of the second modification by the first user only when the first modification has been selected;
receiving, from the first user, a selection from the list of modifications of at least one modification for incorporation into the identified document, including:
receiving a first selection, of the first modification;

enabling selection of the second modification in response to receiving the selection of the first modification and based on the second modification being dependent on the first modification; and receiving a second selection, of the second modification; and merging, based on the received selection of the at least one modification, the selected at least one modification into the identified document, including identifying the first dependency, and based on identifying the first dependency, determining to merge the second modification after merging the first modification.

10. The system of claim 9, wherein the list of modifications includes actionable controls for performing actions on modifications in the list, the actions including:

a modification acceptance action, wherein receiving the selection from a list of modifications includes selecting the modification acceptance action; and a modification rejection action, wherein receiving selection of the modification rejection action for a particular modification causes the particular modification to be discarded.

11. The system of claim 9, wherein creating the list of modifications includes identifying modifications made by particular collaborators to particular duplicate versions of the identified document, each identified modification identifying the particular collaborator and including a description of the modification.

12. The system of claim 9, the operations further comprising:

providing the duplicate version of the identified document to each of one or more additional collaborators; and monitoring the duplicate versions for modifications performed by corresponding additional collaborators.

13. The system of claim 9, wherein merging the selected at least one modification into the identified document includes:

moving the selected at least one modification into a new position in the list of modifications; and annotating the list of modifications to indicate that the selected at least one modification has been merged.

14. The system of claim 9, wherein the list of modifications includes at least one modification made by the owner to the identified document, and wherein the operations further comprise:

adding, to the list of modifications, the at least one modification made by the owner; and annotating, in the list of modifications, the at least one modification made by the owner.

15. A non-transitory computer-readable media encoded with a computer program, the program comprising instructions that when executed by one or more computers cause the one or more computers to perform operations comprising:

identifying a digital document for collaboration, the document identified by a first user with ownership privileges for the document, the collaboration associated with at least one collaborator;

providing a duplicate version of the identified document to each of the at least one identified collaborators;

monitoring, by a monitoring module of a project management system tracking the duplicate versions over a network, the duplicate versions for modifications performed by corresponding collaborators, wherein monitoring includes detecting that at least one modification has been made by a particular collaborator to at least one duplicate version, and wherein the monitoring further includes:

identifying a first modification and a second modification made by a same first collaborator; and determining a first dependency that indicates that the second modification is dependent on the first modification in that the second modification requires prior completion of the first modification;

creating a list of modifications, the created list identifying the modifications performed by the corresponding collaborators in the duplicate versions associated with those collaborators, wherein creating the list of modifications includes updating the list of modifications in response to the monitoring;

providing, for presentation to the first user, the list of modifications, to enable selection of one or more modifications by the first user for incorporation into the identified document, wherein the providing the list of modifications includes enforcing the first dependency by enabling selection of the second modification by the first user only when the first modification has been selected;

receiving, from the first user, a selection from the list of modifications of at least one modification for incorporation into the identified document, including:

receiving a first selection, of the first modification;

enabling selection of the second modification in response to receiving the selection of the first modification and based on the second modification being dependent on the first modification; and receiving a second selection, of the second modification; and merging, based on the received selection of the at least one modification, the selected at least one modification into the identified document, including identifying the first dependency, and based on identifying the first dependency, determining to merge the second modification after merging the first modification.

16. The non-transitory computer-readable media of claim 15, the operations further comprising:

identifying a digital document for collaboration, the document identified by a first user with ownership privileges for the document, the collaboration associated with at least one collaborator;

providing a duplicate version of the identified document to each of the at least one identified collaborators;

monitoring the duplicate versions for modifications performed by corresponding collaborators;

creating a list of modifications, the created list identifying the modifications performed by the corresponding collaborators in the duplicate versions associated with those collaborators;

receiving, from the first user, a selection from the list of modifications of at least one modification for incorporation into the identified document; and merging, based on the received selection, the selected at least one modification into the identified document.

17. The non-transitory computer-readable media of claim 16, wherein the list of modifications includes actionable controls for performing actions on modifications in the list, the actions including:

a modification acceptance action, wherein receiving the selection from a list of modifications includes selecting the modification acceptance action; and a modification rejection action, wherein receiving selection of the modification rejection action for a particular modification causes the particular modification to be discarded.

18. The non-transitory computer-readable media of claim 16, wherein creating the list of modifications includes identifying modifications made by particular collaborators to particular duplicate versions of the identified document, each identified modification identifying the particular collaborator and including a description of the modification.

19. The non-transitory computer-readable media of claim 16, the operations further comprising:
  providing the duplicate version of the identified document to each of one or more additional collaborators; and
  monitoring the duplicate versions for modifications performed by corresponding additional collaborators.

20. The non-transitory computer-readable media of claim 16, wherein merging the selected at least one modification into the identified document includes:
  moving the selected at least one modification into a new position in the list of modifications; and
  annotating the list of modifications to indicate that the selected at least one modification has been merged.

* * * * *